United States Patent [19]

Chen et al.

[11] Patent Number: 5,801,515

[45] Date of Patent: Sep. 1, 1998

[54] METHOD AND APPARATUS FOR ULTRARAPIDLY CHARGING A BATTERY

[76] Inventors: Shu Chen; Yang Chen, both of Room 4, No. 55 Huwanli, Zhuhai Guangdong, Province 519000, China

[21] Appl. No.: 849,091

[22] PCT Filed: Nov. 27, 1995

[86] PCT No.: PCT/CN95/00094

§ 371 Date: Jul. 30, 1997

§ 102(e) Date: Jul. 30, 1997

[87] PCT Pub. No.: WO96/17427

PCT Pub. Date: Jun. 6, 1996

[30] Foreign Application Priority Data

Nov. 28, 1994 [CN] China ................... 94118543.5

[51] Int. Cl.⁶ .................................................. H01M 10/46
[52] U.S. Cl. ........................................ 320/139; 320/145
[58] Field of Search ................................ 320/128, 131, 320/137, 139, 141, 144, 145, 155, 158, 104, 118, 120, 148

[56] References Cited

U.S. PATENT DOCUMENTS 3,886,427  5/1975  Long ....................... 320/156
5,248,928  9/1993  Gilmore .

FOREIGN PATENT DOCUMENTS 87108081  9/1988  China .
2133982   5/1993  China .

*Primary Examiner*—Edward Tso
*Attorney, Agent, or Firm*—Flehr Hohbach Test Albritton & Herbert LLP

[57] ABSTRACT

A method and apparatus for ultrarapidly charging primary or secondary battery. Charging current is multiple-frequency complex pulse current which is comprised of pulse current overlapped by pulse current with at least two different frequency band and arbitrary waveform and opposite narrow pulse whose amplitude is three times higher than amplitude of said pulse current. The charging current may be larger than 1.5C10 and charging is performed in a manner of no discharging. Charging circuit is comprised of at least two different frequency oscillators, switch circuit and opposite narrow pulse generating circuit. The pulse current of different frequency may overlap each other, modulated and scanned and varied on frequency to generate multiple-frequency complex charging current.

12 Claims, 4 Drawing Sheets

(b)                    (c)

(e)                    (f)

(i)                    (j)

METHOD AND APPARATUS FOR ULTRARAPIDLY CHARGING A BATTERY

TECHNICAL FIELD

The present invention relates to a method and apparatus for charging a primary or secondary battery, in particular a method and apparatus for rapidly charging a battery using multiple-frequency composite pulse current without a discharging process.

TECHNICAL BACKGROUND

In a conventional battery charging method, a direct current of 0.1C10 is used to charge a battery for 12–16 hours. Although this method is safe and reliable, it has many defects such as accumulation of polarization, memory effect and very long charging time. In the Chinese Utility Model 91208037.X, the applicant of the present invention described a rapidly charging apparatus which uses "surge multi-wave group pulsating voltage source" to charge a variety kinds of chemical batteries. It diminishes some of the memory effect, but its charging time is more than an hour, which is too long.

In the prior art, there exists a negative pulse charging method, named reciprocating charging method, i.e., charging a Ni-Cd battery with a single pulse current for a duration, then initiating a discharging circuit with a inverted pulse (this pulse is not applied to the battery to be charged) to discharge the battery with a large current in a short time, then repeat the charging and discharging, in this way, cyclically repeating the charging and discharging process until the battery is full. This typical charging method can be found in Hungary Patent No. 189, 832, of which the application in China is No. 87108081 (Examined Publication No.CN100643313), and this method has the advantageous effect of depolarization.

There are many patent applications similar to the above method, but none of them depart from the reciprocate manner of cyclically charging-discharging-charging-discharging.

These methods are a significant improvement compared with the conventional method of slow charging, however, they have not solved the problem that the Ni-Cd battery produces memory effect and the effect of de-polarization is not complete. Now the commercial available charger for Ni-Cd battery which are most excellent in performance and expensive in price must be added a separate device special for discharging, which performs discharging each time before charging, and after the battery is discharged to empty, proceeds automatically to charging operation. This separate discharging process is different from the discharging cycles in the reciprocate-charging process in that it is a forced large current discharging before the start of charging, and the purpose thereof is to prevent the battery from unchargeable status due to the memory effect within the battery. Furthermore, this charging method can not be used to charge a primary battery.

The object of the present invention is to provide a improved method and apparatus for rapidly charging battery, which use multiple-frequency composite pulse large current to perform charging without discharging process so as to eliminate memory effect and shorten the charging time.

SUMMARY OF THE INVENTION

The charging method of the present invention has the following main features:

The charging current is a multiple frequency composite pulse current, which is formed by at least two pulse currents with different frequency bands and arbitrary waveforms overlapped each other, and an inverted sharp pulse, whose amplitude is at least three times higher than that of said pulse current, overlapped thereon; the charging current can use very large capacity, which may be 1-1.5C10 or more than 1.5C10; charging is performed in a manner of charging all the time without discharging process.

The charging apparatus of the present invention includes a charging circuit for generating multiple frequency composite pulse current, and this charging circuit comprises:

at least two oscillators of different operating frequencies for generating pulse signals within different frequency bands;

a switch circuit connected between a charging power source and charging terminals of the battery for controlling the on/off of the charging current, and the controlling terminals thereof are connected in parallel with the respective outputs of said at least two oscillators to generate overlapped multiple frequency pulse signal;

an inverted sharp pulse generating circuit defined by a pulse shaping circuit formed by inductors, capacitors and resistors connected to said switch circuit for generating inverted sharp pulses of which the amplitude is at least three times higher than that of said over-lapped pulse current.

Alternatively, the charging circuit of the present invention can use another kind of oscillators and switch circuit, i.e., comprising:

two oscillators of different operating frequencies, wherein the output of one oscillator modulates the other one for generating modulated multiple frequency composite pulse signal;

a switch circuit connected between a charging power source and charging terminals of a battery for controlling the on/off of the charging current, the controlling terminals thereof are controlled by the modulated multiple composite pulse signal generated by said oscillators.

The charging method and apparatus of the present invention are based on a complete new charging mechanism, thereby have significant advantageous effects that various primary or secondary batteries can be really fully charged in 15–30 minutes.

In the present invention, it is a innovation to the characteristic of the charging current that the charging current flowing into the battery is a group of pulses of multiple frequencies and multiple waveforms which have a great capability of disturbing. The charger designed according to the present invention has a powerful-polarization effect and can significantly refrain from the memory effect of Ni-Cd battery; automatically eliminate the memory effect which has already generated; and refrain from the generating of harmful gas and prevent from or delay the producing of metal deposits. Accordingly, it can be realized that primary batteries can be made really rechargeable.

The charger according to the present invention does not need the special discharging device before charging, and there are not discharge cycles in the charging process, i.e., the battery being charged is only charged without discharging process. This is the first unique feature of the present invention.

The multiple frequency multiple waveform pulse group and inverted peak high voltage sharp pulse generating techniques are used in the present invention, wherein high and sharp pulses of which the amplitude is at least three times higher than that of the fundamental wave are mixed among the group of pulses. This kind of surge current flows into the battery to be charged and applies a powerful effect of disturbance, thereby the distribution of the ions on the surface of the electrodes of the battery is even, while the harmful grains of metal atom deposit are not easy to form, and the potential energy of each point on the electrodes is changed rapidly as the turbulence of the current and reaches an even status in a short time, therefore the memory potential barrier of the Ni-Cd battery can be disturbed. Meanwhile, the generating of the reaction deposit of a primary battery can be refrained from or delayed, accordingly, the really charging to primary batteries can be realized by means of the apparatus of the present invention. When a primary battery has not been used to beyond its fatigue limit (i.e. its internal resistance has not apparently increased), it can be charged and reused repeatedly. This is the second unique feature of the present invention. It was proved by experiments that the stronger this disturbing effect is, the better the charger is. One of the important improvements of the present invention is that frequency-sweep pulses are added. The addition of the frequency-sweep pulses to the first fundamental wave or second fundamental wave results in a more powerful disturbing capability of the composite pulse group, and a more even disturbing effect, consequently, it will not cause the local overheating of the battery and generate harmful gas, and the distribution of ions on the surface of the electrodes is more fine and more even.

Under the above conditions of the charging current, the battery to be charged can endure the charging current of very large capacity, therefore, with the charging method of the present invention, charging current 1–1.5C10 or more than 1.5C10 can be used for charging, and the charging time are significantly shortened.

Since there is not discharging process during the whole charging process, the charger according to the present invention has higher efficiency, shorter charging time, and it can charge the battery to fully charged or over charged to 120% (overcharged to 120% is useful to the battery because the Ni-Cd battery is easy to self-discharge) in a very short time, and it is not necessary to charge the battery to 80% first, then charge it with trickle current for the rest, like the charger available in the market. This is the third unique feature of the present invention.

BRIEF DESCRIPTION TO THE DRAWINGS

The embodiments of the present invention are described in detail as below:

DETAILED DESCRIPTION TO THE INVENTION

Figure 1:
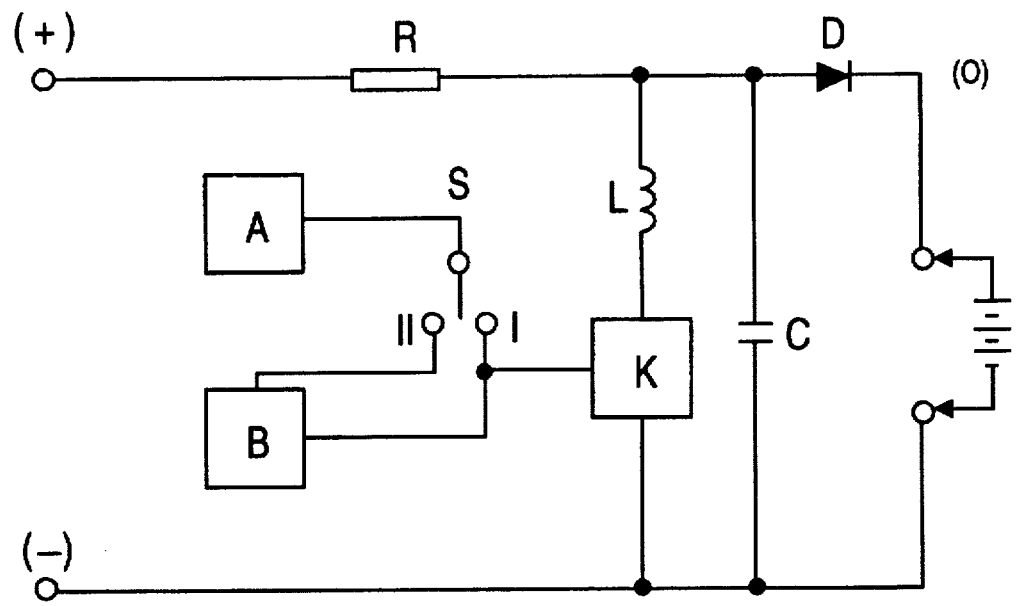
FIG. 1 is a general principle block diagram of the present invention.

Accompanying FIG. 1 is the general principle block diagram. Only the core portion of the charging principle, "multiple frequency multiple waveform composite pulse group voltage source" is described in detail below, the related peripheral circuits such as voltage-reducing rectifier circuit, timing circuit, display circuit, and protection circuit are omitted. The whole circuit comprises a first fundamental wave oscillator [A], a second fundamental wave oscillator [B] and an electronic switch [K]. Each of [A] and [B] has an valid operating frequency range. [A] is a pulsating wave of any frequency within 0.1–60 HZ, and the optimal frequency range thereof is 1–15 HZ; and [B] is pulsating wave of any frequency within 61 HZ–5000 HZ, and the optimal frequency range thereof is 80–150 HZ. The above two waveforms may be arbitrary, and the frequencies thereof may be constant frequency, or sweep frequency. Both waves may be mixed directly at the base (or control terminal) of the switch transistor [K] (the switch S is coupled to I), or [A] wave is used to modulate [B] wave (or opposite) first, then the modulated wave is applied to [K] (the switch S is coupled to II). In both cases, it is common to use composite pulse wave group to control the switching status of [K],so that the output voltage of the charger varies dependent upon the composite waveform at the input of [K], thereby the charging current is forced into the battery to be charged according to the predetermined waveform. [K] through L can be connected in parallel with the two terminals of the power source (as a branch), or in series with the power source (as a resistance). In the case of parallel connection, when [K] is on, i.e., the power source is short-circuited, no current flows into the battery; when [K] is off, all the current from the power source is applied to the battery to be charged.

The DC resistance of the inductor L is small so as to be equivalent to short circuit to a direct current, while the inductance thereof is relative large (1 mH), and its impedance to AC is very high. The inductor L, together with the resistor R and capacitor C, generates inverted peak sharp pulse of which the amplitude is at least three times higher than that of the fundamental wave in the group of composite pulse waves, so as to effective refrain from the generation of the harmful gas within the battery and the memory effect, and possess strong depolarization effect. Only with this kind of charging current can the battery endure the charging current of very large capacity without causing generating of gas, heating and high pressure in the battery during the period until the battery is charged to full. Accordingly, the battery can be once over-charged to saturation in short time with large current, i.e., charging current of 1–1.5C10 or more than 1.5C10, while the supplementary charging with trickle current is no longer necessary, and the primary batteries can become really rechargeable, which is impossible for the conventional charging method.

Figure 2:
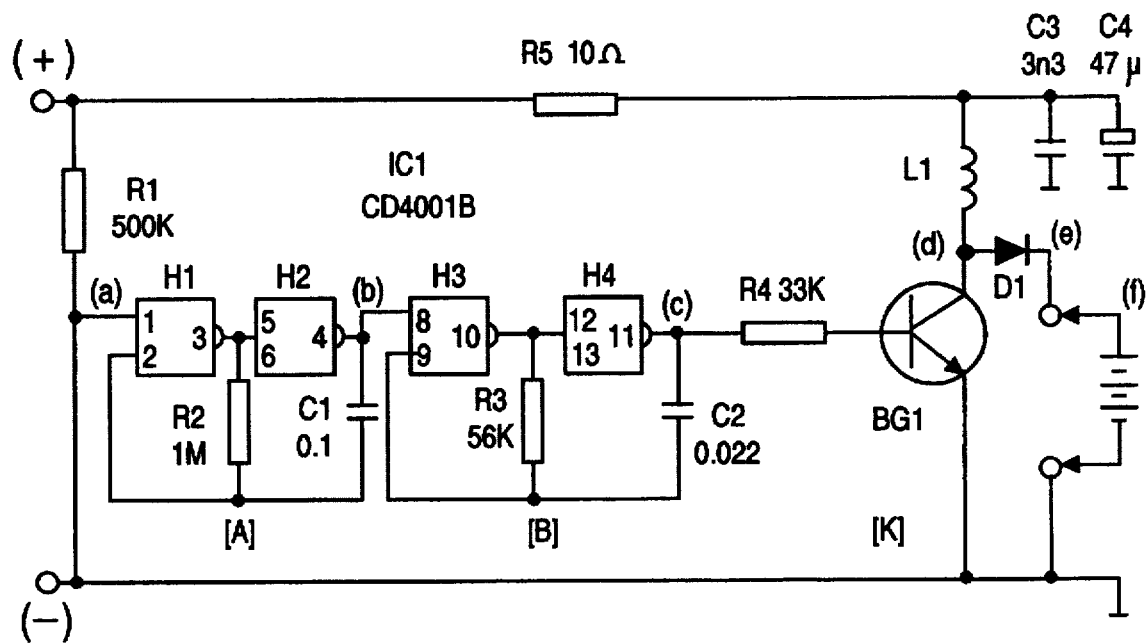
FIG. 2 is a circuit diagram of a first embodiment.

FIG. 2 is the circuit diagram of the first embodiment of the present invention.

The oscillators [A] and [B] are formed by OR NOT gate IC1 (CD4001B), wherein H1 and H2 form the first fundamental wave oscillator [A], and the tested frequency thereof is 6 Hz (measured when H3, H4 are disconnected); H3 and H4 form the oscillator [B], and the tested frequency thereof is 200 HZ (measured when H1, H2 are disconnected). The output pin (4) of [A] is applied to the input pin (8) of [B], to modulate [B], then the modulated composite waveform (see the waveform diagram at test point (c) in FIG. 4) is applied via a buffer resistor R4 (33K) to the base of the switch transistor BG1. BG1 forms a electronic switch [K], of which the two terminals are connected through the inductor L1 of 1 mH) in parallel with the positive and negative electrodes of the power source. When BG1 is turned on, which is equivalent to short-circuiting the power source, no current flows through the battery being charged; when BG1 is turned off, all the current from the power source are applied to the battery. The 1 mH inductor L1 has a small DC resistance, which can be deemed short-circuit for DC, while the inductor L1 has a high AC impedance, and together with the shaping filtering capacitors C3, C4 and resistor R5 causes a high amplitude inverted peak sharp pulse applied to the composite pulse voltage so that the generation of gas and the memory effect within the battery can be effectively refrained from. D1 is a medium power rectifier diode, which allows one-direction current and prevent from the opposite-direction current flowing, so as to prevent the charging voltage from applying to the charger circuit from the opposite direction. R5 is a shaping and current-limiting resistor, of which the resistance value can be changed to adjust the charging current up to 1.5C10. In this embodiment R5 is 10Ω, and the charging current is 500 mA.

Figure 4:
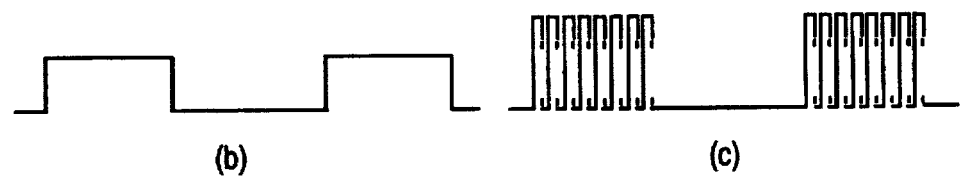
FIG. 4 is waveform diagrams of related measuring points of the circuit of related measuring points of the circuit of the first embodiment.
Figure 4:
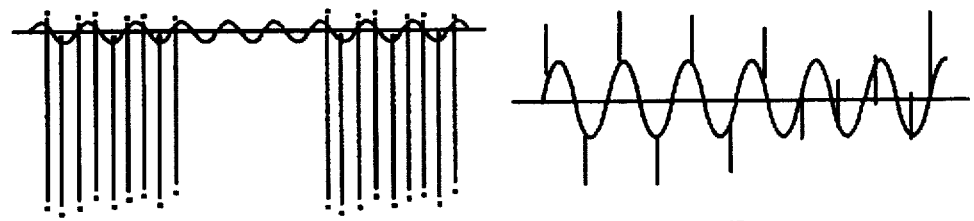
Figure 4:
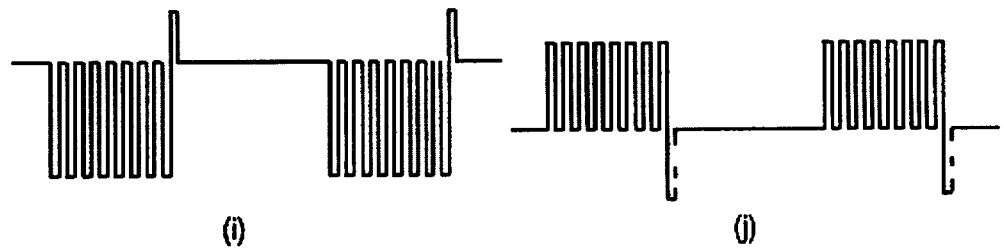

When no load, the output waveform at point (e) is shown in FIG. 4; it is a most unique feature of the present invention.

Figure 3:
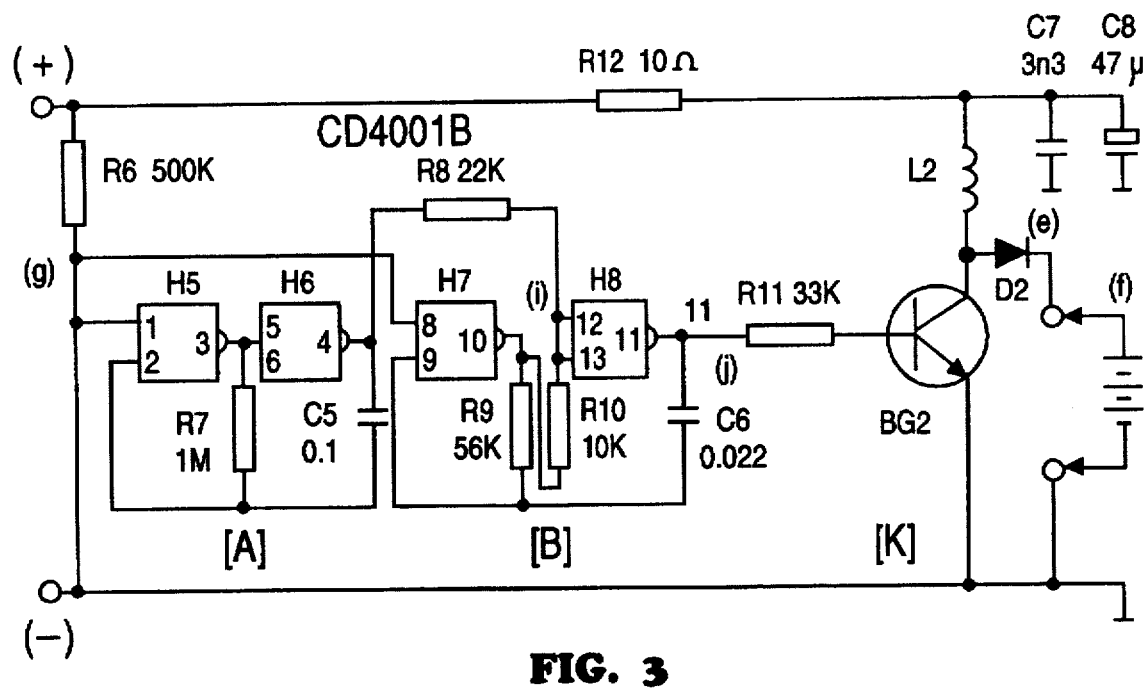
FIG. 3 is a circuit diagram of a second embodiment.

FIG. 3 is the circuit diagram of embodiment 2.

Gate circuits H5, H6 form the first fundamental wave oscillator [A], and H7, H8 form the second fundamental wave oscillator [B], the oscillating frequencies thereof are the same as in embodiment 1, respectively. What is different from embodiment 1 is that the inputs of [A] and [B] (i.e., inputs of H5 and H7) are connected together, the outputs of H6 and H7 are both applied to the input of the inverter H8, and the composite pulsating wave group are obtained at the output of H8. The electronic switch [K] (BG2) is controlled by means of a buffer resistor R1 (33K). The other parts and their operation are the same as embodiment 1, and the waveforms of the test points are corresponding to that in embodiment 1.

FIG. 4 shows the waveforms of test points.

(b) shows the waveform output of [A] in FIG. 2[A]

(c) shows the wave form output by [B] in FIG. 2[B]

(e) shows the waveform of the general output when no load (no battery mounted) in FIG. 2, which is the unique waveform of the present invention.

(f) shows the waveform of the general output when charging a battery (locally enlarged)

(i), (j) are waveforms of the input and output of H8 in FIG. 3, respectively.

Figure 5:
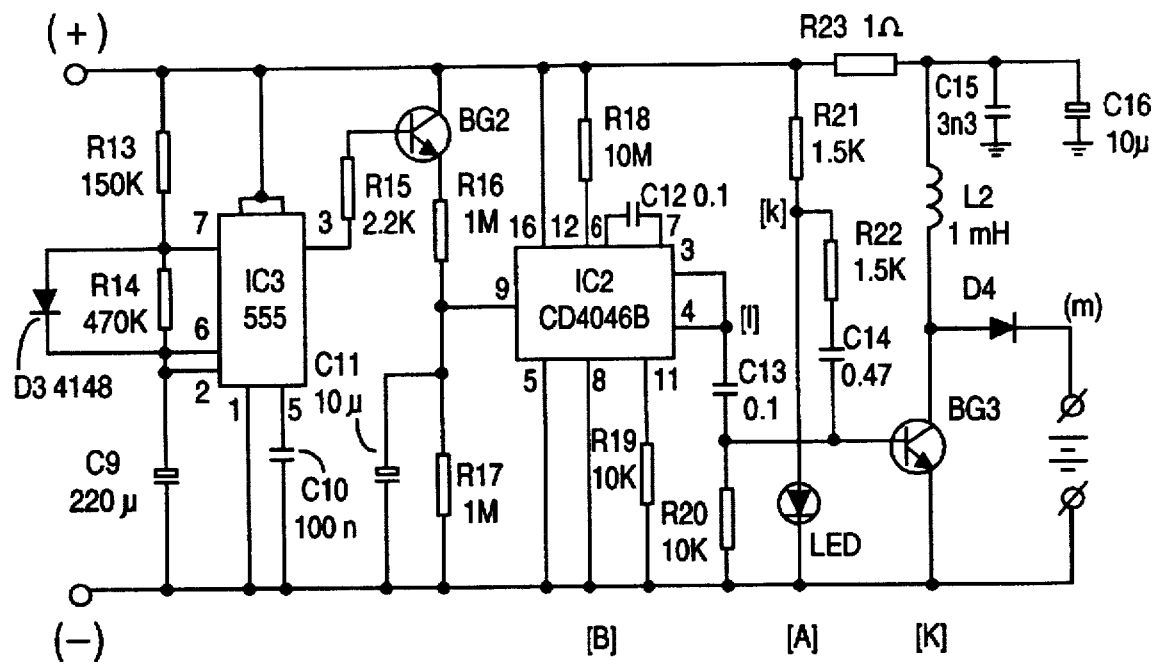
FIG. 5 is a circuit diagram of a third embodiment.

FIG. 5 is a circuit diagram of embodiment 3. This is a kind of sweep frequency overlapping circuit.

The first fundamental wave oscillator [A] comprises light emit diode LED and current-limiting resistor R21, the fundamental oscillating frequency thereof is 5 HZ and it outputs a single rectangular wave, which is coupled to the base of the switch [K] BG3 by means of R22, C14. The second fundamental wave oscillator [B] comprises a fundamental rectangular wave oscillator formed by phase lock loop integration circuit IC2 CD4046B and its peripheral circuits, the oscillating frequency thereof is 200 HZ. As the capacitor C11 is connected to the input pin 9 of the voltage controlled oscillator VCO, so that when the electronic switch BG2 is turned on, C11 is charged by the power source through R16, thereby the voltage of C11 is increased gradually from 0, resulting in the frequency of the pulse waves at the output pins 3, 4 of CD 4046B scans from low to high; when the switch BG2 is turned off, C11 is discharged through R17, the frequency of the pulse waves at the output of CD4046B scans from high to low. This frequency sweep wave is coupled by C13 to the base of BG3, and mixed with the relatively high amplitude single pulse low frequency wave output from the oscillator [A] to form a multiple composite pulse group, so as to control the on/off of the switch transistor BG3 and output the amplified strong disturbing multiple frequency multiple waveform pulse group at the collector of BG3. By means of the combination of inductor L2, resistor R23 and capacitors C15, C16, an inverted peak sharp pulse of which the amplitude is at least three times higher than that of the fundamental wave is formed, and these strong disturbing composite pulse groups are applied to the battery to be charged via an invert-preventing diode D4. The existence of D4 results in that the battery can be only charged and can not be discharged, thereby the charging efficiency is significantly increased, the charging time is shortened, and the energy consuming during charging is decreased. IC3555 forms a flip-flop, of which the 3 pins output switching pulses with duty cycle of 1:1 when power turned on, i.e., the high level duration is 0.5 minute, and the low level duration is 0.5 minute. This signal controls the on/off of BG2, turned on for 0.5 minute, and turned off for 0.5 minute.

Figure 6:
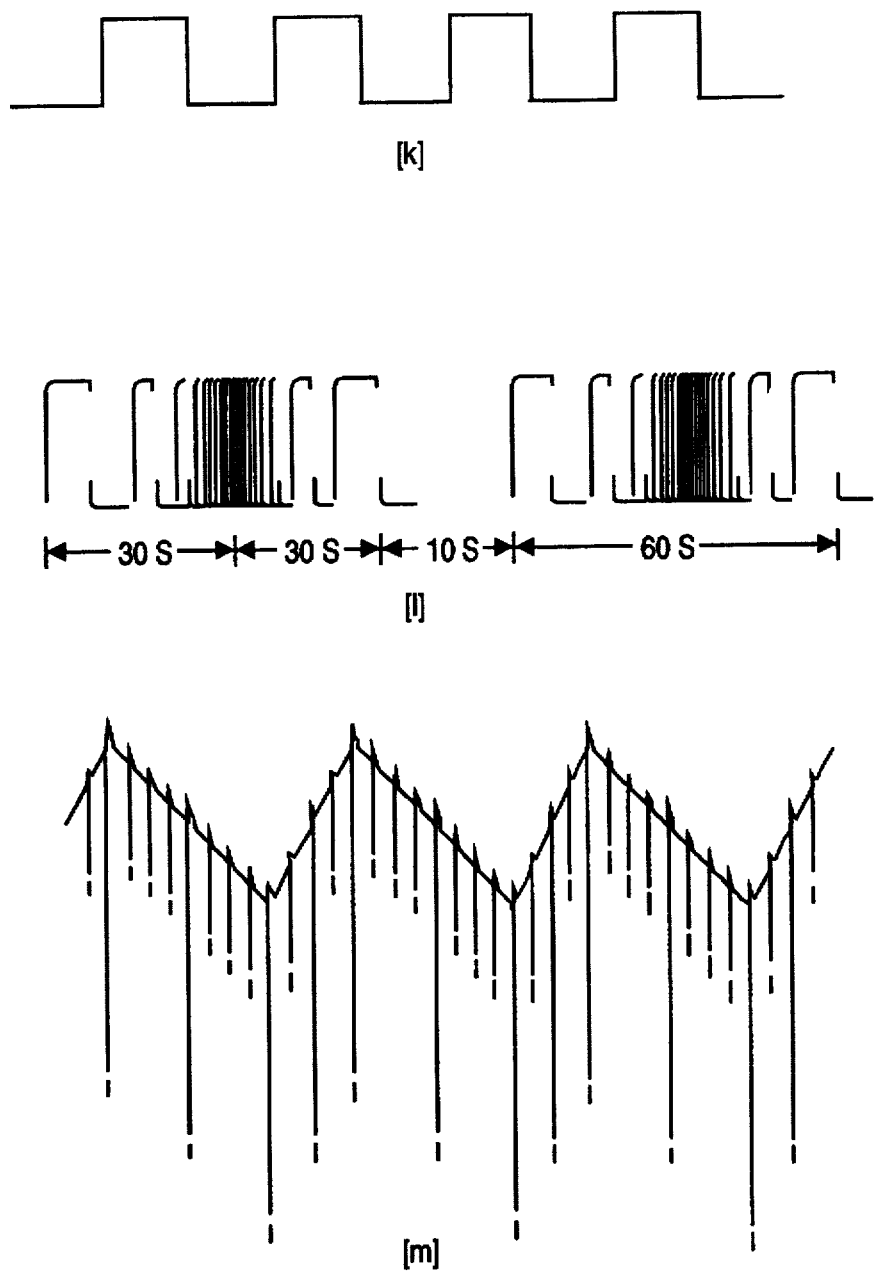
FIG. 6 is waveform diagrams of related measuring points of the circuit of the third embodiment.

FIG. 6 shows the waveforms of the test points in FIG. 5, in which (k) is the output waveform of oscillator [A]; (1) is the output waveform of oscillator [B]; (m) is the general output waveform without the battery. As shown in these waveforms, among the low frequency large ripple waves there are mixed high frequency small ripple waves, and among these two composite waves there are sharp and narrow pulses of which the amplitude is several times as much as theirs. As shown in this figure, compared with FIG. 4. The pulse wave is a sweep frequency modulated wave. This is the core of the present invention: the waveform of multiple frequency multiple waveform composite pulse group voltage source, which is the most unique feature different from all the conventional charger. This unique waveform can be measured with a normal oscilloscope connected to the output of the charger (without load), therefore it is the unique feature of the present invention.

Figure 7:
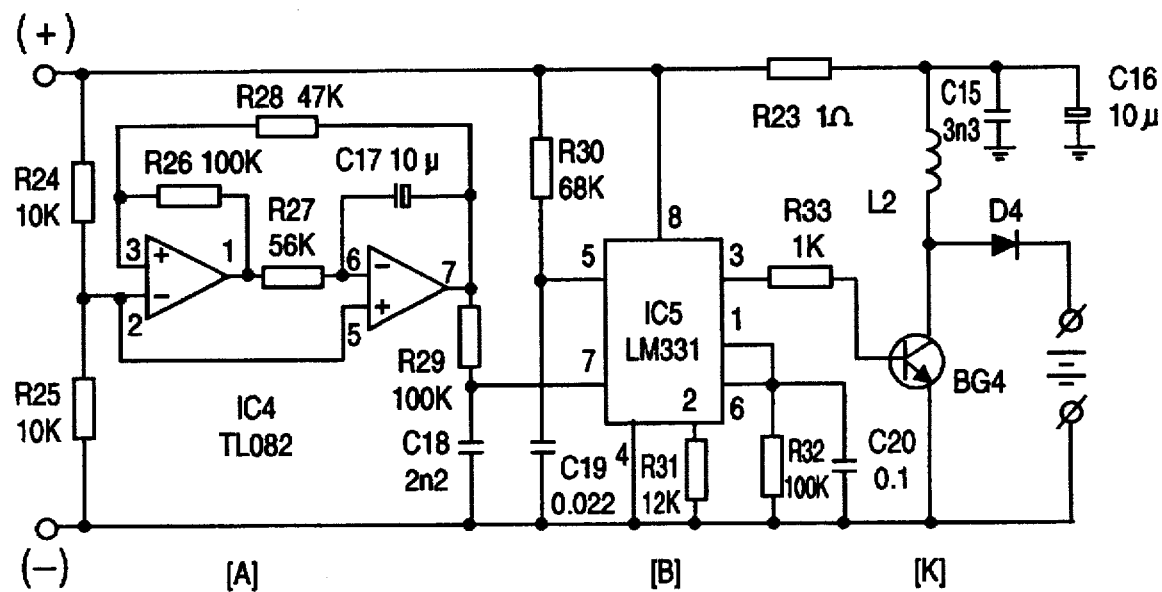
FIG. 7 is a circuit diagram of a fourth embodiment.

FIG. 7 is the circuit diagram of embodiment 4. This embodiment is a modulated sweep pulse group generator.

The first fundamental wave generator [A] is a triangular wave generator formed by two operating amplifiers IC4 TL082, of which pin 7 outputs continuous triangular wave with frequency of 1 HZ. The second fundamental wave oscillator [B] is a frequency sweep signal generator formed by a voltage controlled oscillator (VCO) of IC5 LM331, of which the center frequency is determined by R30, R31, R32, and C19, C20, in the present embodiment, the center frequency is 180 HZ, and under the control of the triangular wave output from the pin 7 of IC4, the VCO of IC5 generates sweep signal of 100–260 HZ. The modulated amplified composite pulse group in this frequency-sweep range is output from pin 3 of IC5, and applied to the input of switch transistor BG4. The process thereafter is the same as embodiment 1, and the description thereof is omitted.

We claim:

1. A method for rapidly charging a battery comprising coupling to said battery a composite charging current that includes a first pulse train whose frequency is within a range of 0.1 Hz to 60 Hz, a second pulse train whose frequency is within a range of 61 Hz to 5,000 Hz, and a third pulse train of inverted narrow-width pulses whose amplitude is at least three times greater than an amplitude of a combination said first pulse train and said second pulse train;

wherein said composite charging current charges without discharging said battery.

2. The method of claim 1, wherein said composite current has at least one characteristic selected from the group consisting of (a) said first pulse train has a frequency in a range of 1 Hz to 15 Hz, and (b) said second pulse train has a frequency in a range of 80 Hz to 250 Hz.

3. The method of claim 1, wherein said composite current has at least one characteristic selected from the group consisting of (a) said first pulse train has a swept frequency, (b) said first pulse train has a constant frequency, (c) said second pulse train has a swept frequency, and (d) said second pulse train has a constant frequency.

4. The method of claim 1, wherein said composite current comprises only swept frequencies.

5. An apparatus for rapidly charging a battery, including:

a composite charging current circuit that provides a composite charging current and includes:

a first oscillator that provides a first pulse train whose frequency is within a range of 0.1 Hz to 60 Hz;

a second oscillator that provides a second pulse train whose frequency is within a range of 61 Hz to 5,000 Hz;

a switch circuit coupled between a source of charging power and charging terminals of said battery to control an on and off state of said charging current, said switch current also coupled to output terminals of said first oscillator and said second oscillator to present generated overlapping multiple frequency current pulse signals therefrom;

an inverted sharp pulse generator circuit, comprising at least an inductor, a capacitor, and a resistor, coupled to said switch circuit to generate a train of inverted narrow-width pulses whose amplitude is at least three times greater than an amplitude of a combination said first pulse train and said second pulse train;

wherein said composite charging current charges without discharging said battery.

6. The apparatus of claim 5, wherein said composite charging current circuit has at least one characteristic selected from the group consisting of (a) said first frequency has a range of 1 Hz to 15 Hz, (b) said first frequency is swept, (c) said first frequency is constant, (d) said second frequency has a range of 80 Hz to 250 Hz, (e) said second frequency is swept, and (f) said second frequency is constant.

7. The apparatus of claim 5, wherein said composite charging current circuit has at least one characteristic selected from the group consisting of (a) said first pulse train modulates said second oscillator to vary said second frequency, and (b) said second pulse train modulates said first oscillator to vary said first frequency;

wherein said composite current includes modulated multiple frequencies.

8. The apparatus of claim 7, wherein said composite charging current circuit has at least one characteristic selected from the group consisting of (a) said first frequency has a range of 1 Hz to 15 Hz, (b) said first frequency is swept, (c) said first frequency is constant, (d) said second frequency has a range of 80 Hz to 250 Hz, (e) said second frequency is swept, and (f) said second frequency is constant.

9. The apparatus of claim 5, wherein said apparatus is useable in at least one environment selected from the group consisting of (a) an independent battery charger, and (b) a battery charged included with an electronic device.

10. The apparatus of claim 6, wherein said apparatus is useable in at least one environment selected from the group consisting of (a) an independent battery charger, and (b) a battery charged included with an electronic device.

11. The apparatus of claim 7, wherein said apparatus is useable in at least one environment selected from the group consisting of (a) an independent battery charger, and (b) a battery charged included with an electronic device.

12. The apparatus of claim 8, wherein said apparatus is useable in at least one environment selected from the group consisting of (a) an independent battery charger, and (b) a battery charged included with an electronic device.

* * * * *